(12) United States Patent
Jung et al.

(10) Patent No.: US 7,595,083 B2
(45) Date of Patent: *Sep. 29, 2009

(54) APPARATUS FOR ALIGNING DISPENSER SYSTEM, METHOD OF ALIGNING DISPENSER SYSTEM, AND DISPENSER ALIGNMENT SYSTEM

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 919 days.

This patent is subject to a terminal disclaimer.

(21) Appl. No.: 10/824,585

(22) Filed: Apr. 15, 2004

(65) Prior Publication Data
US 2005/0129850 A1 Jun. 16, 2005

(30) Foreign Application Priority Data
Dec. 10, 2003 (KR) ............... 10-2003-0089854

(51) Int. Cl.
C23C 16/52 (2006.01)
C23C 16/00 (2006.01)

(52) U.S. Cl. ............... 427/8; 427/64; 118/712; 118/713

(58) Field of Classification Search ............... 427/8–10, 427/64, 69
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |

(Continued)

FOREIGN PATENT DOCUMENTS

EP 1 003 066 5/2000

(Continued)

*Primary Examiner*—Timothy H Meeks
*Assistant Examiner*—David Turocy
(74) *Attorney, Agent, or Firm*—McKenna Long & Aldridge

(57) ABSTRACT

An apparatus for aligning a dispenser includes a table having a first alignment mark, an alignment plate provided along at least one side of the table, at least one syringe supplying a dispensing material to the alignment plate through a nozzle provided at one end portion thereof to form a second alignment mark, a first image camera provided along a side of the syringe and detecting an image of the second alignment mark, a second image camera detecting an image of the first alignment mark, and an alignment control unit aligning the image of the second alignment mark and a first reference position, and aligning an image of the first alignment mark and a second reference position.

7 Claims, 17 Drawing Sheets

U.S. PATENT DOCUMENTS

| | | | |
|---|---|---|---|
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 2001/0021000 A1 | 9/2001 | Egami | |
| 2003/0081077 A1* | 5/2003 | Nakamura et al. | 347/65 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 05-345160 * | 12/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 07-132259 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 09-122554 A | 5/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |

| | | | | | | |
|---|---|---|---|---|---|---|
| JP | 2001-356353 | 12/2001 | | JP | 2002-202512 | 7/2002 |
| JP | 2001-356354 | 12/2001 | | JP | 2002-202514 | 7/2002 |
| JP | 2002-14360 | 1/2002 | | JP | 2002-214626 | 7/2002 |
| JP | 2002-23176 | 1/2002 | | JP | 2003-001170 | 1/2003 |
| JP | 2002-49045 | 2/2002 | | JP | 2003-142816 A | 5/2003 |
| JP | 2002-82340 | 3/2002 | | JP | 2003142816 A * | 5/2003 |
| JP | 2002-90759 | 3/2002 | | JP | 2003-177411 A | 6/2003 |
| JP | 2002-90760 | 3/2002 | | JP | 2003-284985 | 10/2003 |
| JP | 2002-107740 | 4/2002 | | KR | 2000-0035302 | 6/2000 |
| JP | 2002-122872 | 4/2002 | | WO | WO 00/61297 A1 | 4/2000 |
| JP | 2002-122873 | 4/2002 | | WO | WO 02/99851 A2 | 5/2002 |
| JP | 2002-139734 | 5/2002 | | | | |

* cited by examiner

APPARATUS FOR ALIGNING DISPENSER SYSTEM, METHOD OF ALIGNING DISPENSER SYSTEM, AND DISPENSER ALIGNMENT SYSTEM

The present invention claims the benefit of Korean Patent Application No. 89854/2003 filed in Korea on Dec. 10, 2003, which is hereby incorporated by reference.

BACKGROUND OF THE INVENTION

1. Field of the Invention

The present invention relates to an apparatus for aligning a dispenser, a method of aligning a dispenser, and a dispenser alignment system, and more particularly, to an apparatus for aligning a liquid crystal dispenser, a method of aligning a liquid crystal dispenser, and a dispenser alignment system.

2. Description of the Related Art

In general, liquid crystal display (LCD) devices display images based upon data signals that are supplied to individual liquid crystal cells arranged in a matrix configuration. Accordingly, light transmittance of each of the individual liquid crystal cells is controlled to display the images.

The LCD devices commonly include a liquid crystal display panel having pixels arranged in a matrix configuration and a driving circuit for driving the pixels. The liquid crystal display panel includes a color filter (CF) substrate and a thin film transistor (TFT) array substrate attached together to face each other using a seal pattern formed along outer edge portions of an effective image display part. Accordingly, spacers are formed on either the TFT array substrate or the CF substrate to provide a uniform cell gap between the attached CF and TFT array substrates, and a liquid crystal layer is positioned between the CF and TFT array substrates within the cell gap. In addition, a polarization plate and a phase difference plate are provided at an outer surface of the TFT array substrate and the CF substrate. Thus, by selectively changing a light transmission state or a light refractivity state, the LCD device can have high luminance and contrast characteristics.

In the liquid crystal display panel, a common electrode and a pixel electrode are formed to induce an electric field to the liquid crystal layer. For example, when a voltage is supplied to the common electrode and a voltage supplied to the pixel electrode is controlled, individual light transmittance of unit pixels are controlled. In order to control the voltage supplied to the pixel electrode by the unit pixels, a TFT is commonly used as a switching unit that is formed at each of the unit pixels. In addition, alignment layers are formed at both facing surfaces of the TFT array substrate and the CF substrate, and the alignment layers are rubbed to provide an initial alignment direction of liquid crystals of the liquid crystal layer.

Elements of the liquid crystal display device will now be described with reference to the accompanying drawings.

FIG. 1 is a plan view of a unit liquid crystal display panel according to the related art. In FIG. 1, a unit liquid crystal display panel is formed by a TFT array substrate and a CF substrate. As shown in FIG. 1, a liquid crystal display panel 100 includes an image display part 113 where the liquid crystal cells are arranged in a matrix configuration, a gate pad part 114 connected to gate lines of the image display part 113, and a data pad part 115 connected to data lines. The gate pad part 114 and the data pad part 115 are formed along edge regions of the TFT array substrate 101 that do not overlap with the CF substrate 102. The gate pad part 114 supplies scan signals from a gate driver integrated circuit (IC) (not shown) to the gate lines of the image display part 113, and the data pad part 115 supplies data signals from a data driver IC (not shown) to the data lines of the image display part 113.

The data lines and the gate lines are provided on the TFT array substrate 101 of the image display part 113 to intersect each other. In addition, a TFT is provided at each intersection of the data and gate lines for switching a corresponding one of the liquid crystal cells. Moreover, a pixel electrode is provided on the TFT array substrate 101 for driving each of the liquid crystal cells connected to a corresponding one of the TFTs, and a passivation film is formed along an entire surface of the TFT array substrate 101 for protecting the TFTs.

Although not shown, the CF substrate 102 includes color filters provided within the liquid crystal cells and are separated by a black matrix. In addition, a transparent common electrode (not shown) is provided on the CF substrate 102 of the image display part 113. Furthermore, the TFT array substrate 101 and the CF substrate 102 are attached together using a seal pattern 116 formed along outer edge portions of the image display part 113, and spacers (not shown) are provided between the TFT array substrate 101 and the CF substrate 102 to form a uniform cell gap.

During fabrication of the liquid crystal display panel, simultaneous formation of a plurality of individual liquid crystal display panels on a large-scale mother substrate is commonly performed. Accordingly, a process for separating the individual liquid crystal display panels from the large-scale mother substrate is required, wherein cutting and processing of the mother substrate is performed. Then, after each of the individual liquid crystal display panels is separated from the large-scale mother substrate, liquid crystal material is injected through a liquid crystal injection port 118 formed in the seal pattern 116 to form a liquid crystal layer within the cell gap that is formed between the TFT array substrate 101 and the CF substrate 102. Next, the liquid crystal injection port 118 is sealed.

According to the fabrication of the liquid crystal display panel, the TFT array substrate 101 and the CF substrate 102 are separately fabricated on individual first and second mother substrates that are attached together to include a uniform cell gap therebetween. Next, the attached first and second mother substrates are cut into individual unit panels, and the liquid crystal material is injected into the cell gap between the TFT array substrate 101 and the CF substrate 102. Then, a process of forming the seal pattern 116 along the outer edges of the image display part 113 is required to attach the TFT array substrate 101 and the CF substrate 102 together.

FIG. 2A is schematic plan view of an apparatus for printing a seal pattern according to the related art, and FIG. 2B is a schematic cross sectional view of the apparatus of FIG. 2A according to the related art. In FIGS. 2A and 2B, a patterned screen mask 206 is provided onto a substrate 200 having a plurality of seal pattern regions 216A~216F, wherein the substrate 200 may be one of the TFT substrate 101 (in FIG. 1) or the CF substrate 102 (in FIG. 1). Then, a rubber squeegee 208 is provided for selectively supplying sealant material 203 to exposed portions of the substrate 200 through the patterned screen mask 206. Accordingly, a plurality of seal patterns 216A~216F are simultaneously formed along each outer edge portion of image display parts 213A~213F of the substrate 200, and liquid crystal injection openings 204A~204F are formed at one side of each of the seal patterns 216A~216F for injecting liquid crystal material into a gap to be formed between the TFT array substrate 101 (in FIG. 1) and the CF substrate 102 (in FIG. 1). Thus, the seal patterns 216A~216F formed on the substrate 200 confine the liquid crystal material and prevent leakage of the liquid crystal material.

A method of screen printing the seal patterns 216A~216F includes applying the sealant 203 onto the patterned screen mask 206, forming the seal patterns 216A~216F on the substrate 200 using the rubber squeegee 208, and drying the seal pattern 216A~216F by evaporating solvent contained in the sealant material 203 and leveling the sealant material 203. Although the screen printing method is commonly used because of its simplicity, the method results in significant amounts of sealant material waste. Specifically, large amounts of the sealant material is wasted since it is applied along an entire surface of the patterned screen mask 206 in order to simultaneously form the seal patterns 216A~216F using the rubber squeegee 208. Accordingly, any excess sealant material that is printed through the plurality of seal pattern regions 216A~216F of the patterned screen mask 206 is discarded.

In addition, the screen printing method is disadvantageous in that a rubbed alignment layer (not shown) formed on the substrate 200 is degraded as a result of the patterned screen mask 206 being brought into contact with the substrate 200. Accordingly, the degradation of the rubbed alignment layer corrupts picture quality of the LCD device. Thus, a seal dispensing method has been developed.

FIG. 3 is a schematic plan view of method of dispensing a seal pattern according to the related art. In FIG. 3, as a substrate 300 loaded onto a table 310 is moved X- and Y-directions, a plurality of seal patterns 316A~316F are formed along outer edge portions of each image display part 313A~313F formed on the substrate 300 by applying pressure to a plurality of syringes 301A~301C filled with sealant material. Accordingly, a first column group of the seal patterns 316A~316C are simultaneously formed along outer edge portions of the image display parts 313A~313C, and then a second column group of the seal patterns 316D~316F are simultaneously formed along outer edge portions of the image display parts 313D~313F. Thus, sealant material waste may be reduced. In addition, since the syringes 301A~301C do not contact the rubbed alignment layer (not shown), damage to the rubbed alignment layer is prevented and picture quality of the LCD device is not corrupted. However, the syringes 301A~301C must be precisely aligned with the substrate 300 to accurately form the seal patterns 316A~316F at desired positions. For example, if the syringes 301A~301C are not properly aligned with the substrate 300, the seal patterns 316A~316F formed on the substrate 300 can be formed within the image display parts 313A~313F, rather than along the outer edge portions of the image display parts 313A~313F. Accordingly, the liquid crystal display panel may be defective.

FIGS. 4A to 4F are sequential schematic perspective views of a dispenser alignment method according to the related art. In FIG. 4A, a dummy substrate 411 is loaded onto a table 410.

In FIG. 4B, the table 410 is moved to a predetermined position, and sealant material is discharged onto the dummy substrate 411 through a syringe 401A to form a first cross alignment pattern 412. Then, an image of the first cross alignment pattern 412 is detected using a first image camera 402A provided at a side of the syringe 401A, and the image is displayed using a display unit 420. The display unit 420 simultaneously displays a position of the first alignment pattern 412 and a first reference position.

In FIG. 4C, the table 410 is moved in X- and Y-directions so that the position of the first alignment pattern 412 displayed on the display unit 420 and the first reference position can be aligned to correspond to each other.

In FIG. 4D, after the table 410 is moved to a predetermined different position, the sealant material is discharged onto the dummy substrate 411 through the syringe 401A to form a second cross alignment pattern 413.

In FIG. 4E, the image of the second alignment pattern 413 is detected using a second image camera 402B, and is displayed using the display unit 420. In addition, the display unit 420 simultaneously displays the position of the second alignment pattern 413 and a second reference position.

In FIG. 4F, the second image camera 402B is moved along X- and Y-directions so that the position of the second alignment pattern 413 displayed on the display unit 420 and the second reference position can be aligned to correspond to each other. Then, after the dispenser is aligned using the dummy substrate 411, the dummy substrate 411 is unloaded from the table 410, and a substrate having a plurality of image display parts (not shown) formed thereon is loaded onto the table 410. Next, seal patterns are formed along each outer edge portion of the image display parts through a plurality of syringes (not shown).

In FIGS. 4A-4F, when sealant material filled in the plurality of syringes (not shown) decreases to an amount that further seal patterns may not be formed, the syringe or syringes must be replaced with new syringes filled with sealant material. Accordingly, since an alignment state between the dispenser and the table 410 is compromised due to replacement of the syringe(s), the dispenser alignment process, as shown in FIGS. 4A to 4F, must be repeated. In addition, if a defective seal pattern is detected during a follow-up testing process, the syringe(s) may be replaced and the dispenser alignment process, as shown in FIGS. 4A to 4F, must be repeated. Moreover, anytime the syringe(s) are moved or replaced, the dispenser alignment process, as shown in FIGS. 4A to 4F, must be repeated.

As sizes of the liquid crystal display panels are increased, an area of the substrate for fabricating large-scale liquid crystal display panels also increases. Accordingly, since the dummy substrate 411 used for aligning the dispenser must be substantially the same size as the substrate for fabricating the liquid crystal display panels, the size of the dummy substrate 411 must be increased. Thus, manual loading and unloading of the dummy substrate 411 increases a processing time for aligning the dispenser, thereby degrading productivity of the LCD device. In addition, since loading and unloading of the large-scale dummy substrate 411 is manually performed, probability of damage to the dummy substrate 411 increases, thereby increasing production costs of the LCD device. Moreover, in order to manually load and unload the large-scale dummy substrate 411, a certain amount of space must be reserved for storage of the large-scale dummy substrate 411. Thus, efficient use of clean room space in which the LCD device is fabricated decreases, thereby increasing facility costs.

In addition, when sealant material filled in the syringe(s) falls below a preset level and is not adequate to form additional seal patterns, the syringe(s) must be replaced with a new syringe. Alternatively, when a defective seal pattern is detected during a follow-up testing process, the dummy substrate must be loaded onto the table to align the dispenser and then unloaded, thereby increasing processing time and reducing productivity.

SUMMARY OF THE INVENTION

Accordingly, the present invention is directed to an apparatus for aligning a liquid crystal dispenser, a method of aligning a liquid crystal dispenser, and a dispenser alignment system that substantially obviates one or more of the problems due to limitations and disadvantages of the related art.

An object of the present invention is to provide an apparatus for aligning a dispenser for fabrication of large-scale liquid crystal display panels.

Another object of the present invention is to provide a method for aligning a dispenser for fabrication of large-scale liquid crystal display panels.

Another object of the present invention is to provide an apparatus for aligning a dispenser for fabrication of a substrate.

Another object of the present invention is to provide a method for aligning a dispenser for fabrication of a substrate.

Another object of the present invention is to provide a dispenser alignment system for fabrication of large-scale liquid crystal display panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for aligning a dispenser includes a table having a first alignment mark, an alignment plate provided along at least one side of the table, at least one syringe supplying a dispensing material to the alignment plate through a nozzle provided at one end portion thereof to form a second alignment mark, a first image camera provided along a side of the syringe and detecting an image of the second alignment mark, a second image camera detecting an image of the first alignment mark, and an alignment control unit aligning the image of the second alignment mark and a first reference position, and aligning the image of the first alignment mark and a second reference position.

In another aspect, a method for aligning a dispenser includes attaching an alignment plate along at least one side of a table having a first alignment mark, forming a second alignment mark on the alignment plate using a first syringe, moving the table along at least one of X- and Y-directions, detecting an image of the second alignment mark using a first camera and aligning the image of the second alignment mark and a first reference position, and detecting an image of the first alignment mark using a second camera and aligning the image of the first alignment mark and a second reference position.

In another aspect, a method for aligning a dispenser includes detecting a position of a second alignment mark formed using a first syringe on an alignment plate of a table, moving the table along at least one of X- and Y-directions to align the position of the second alignment mark with a first reference position, detecting a position of a first alignment mark formed on the table, and aligning the position of the first alignment mark with a second reference position.

In another aspect, a dispenser alignment system includes an alignment plate provided along at least one side of a table, the table having a first alignment mark and the alignment plate having a second alignment mark, a first image camera detecting an image of the second alignment mark, a second image camera detecting an image of the first alignment mark, and an alignment control unit aligning the image of the second alignment mark and a first reference position, and aligning an image of the first alignment mark and a second reference position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
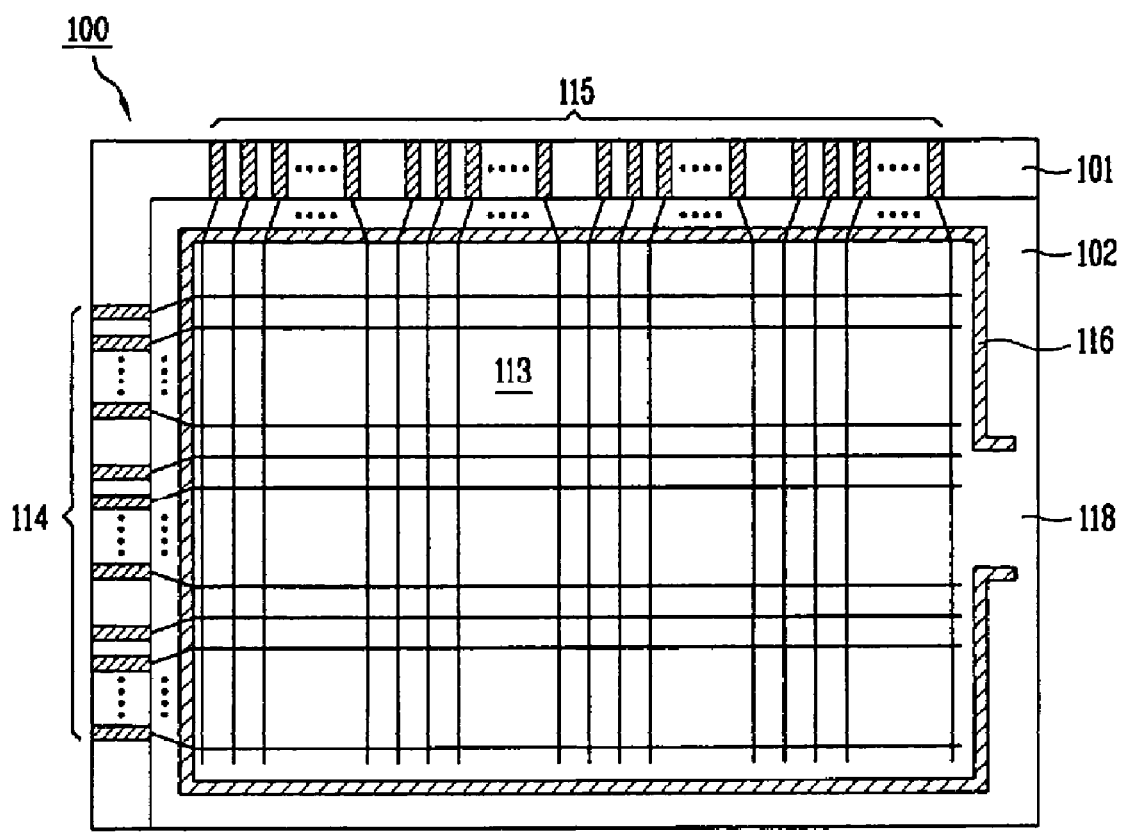
FIG. 1 is a plan view of a unit liquid crystal display panel according to the related art.
Figure 2A:
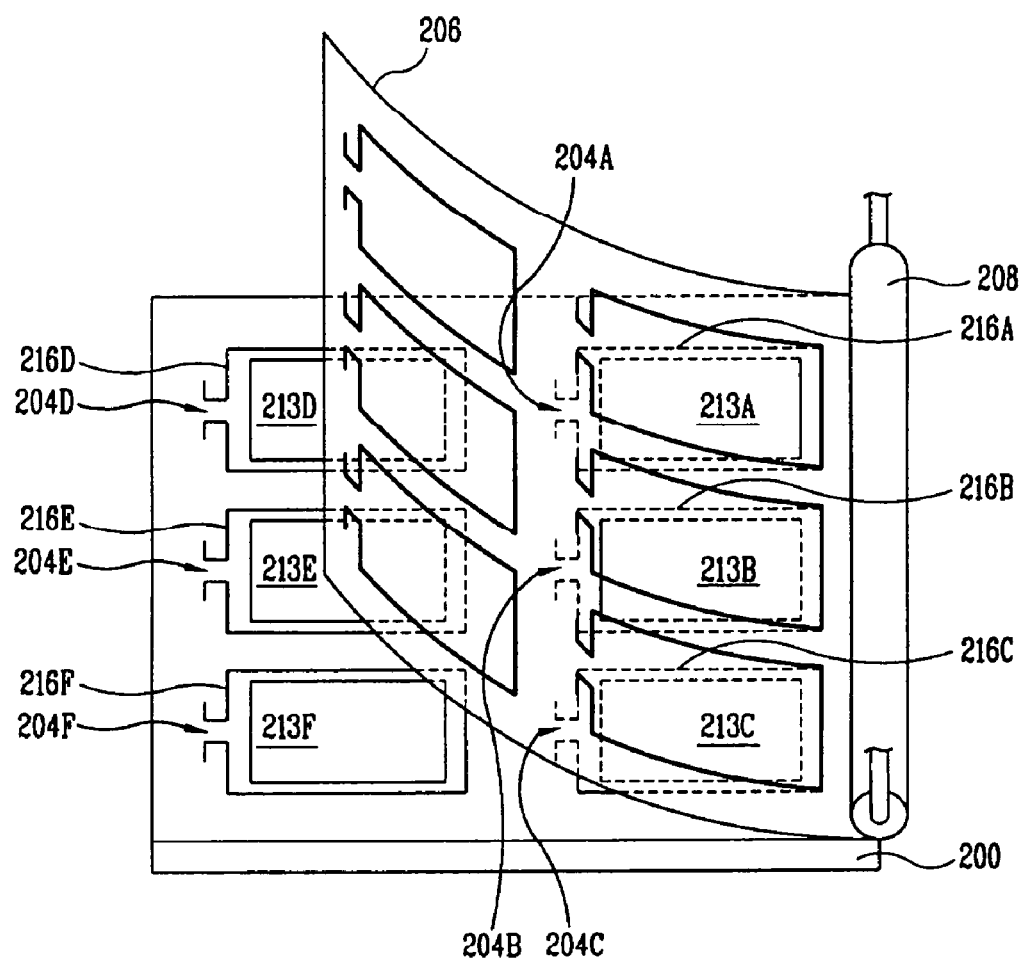
FIG. 2A is schematic plan view of an apparatus for printing a seal pattern according to the related art.
Figure 2B:
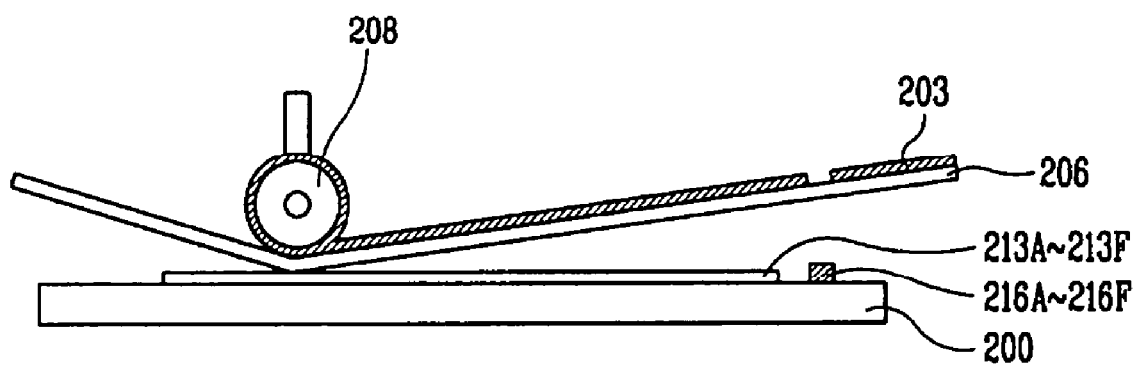
FIG. 2B is a schematic cross sectional view of the apparatus of FIG. 2A according to the related art.
Figure 3:
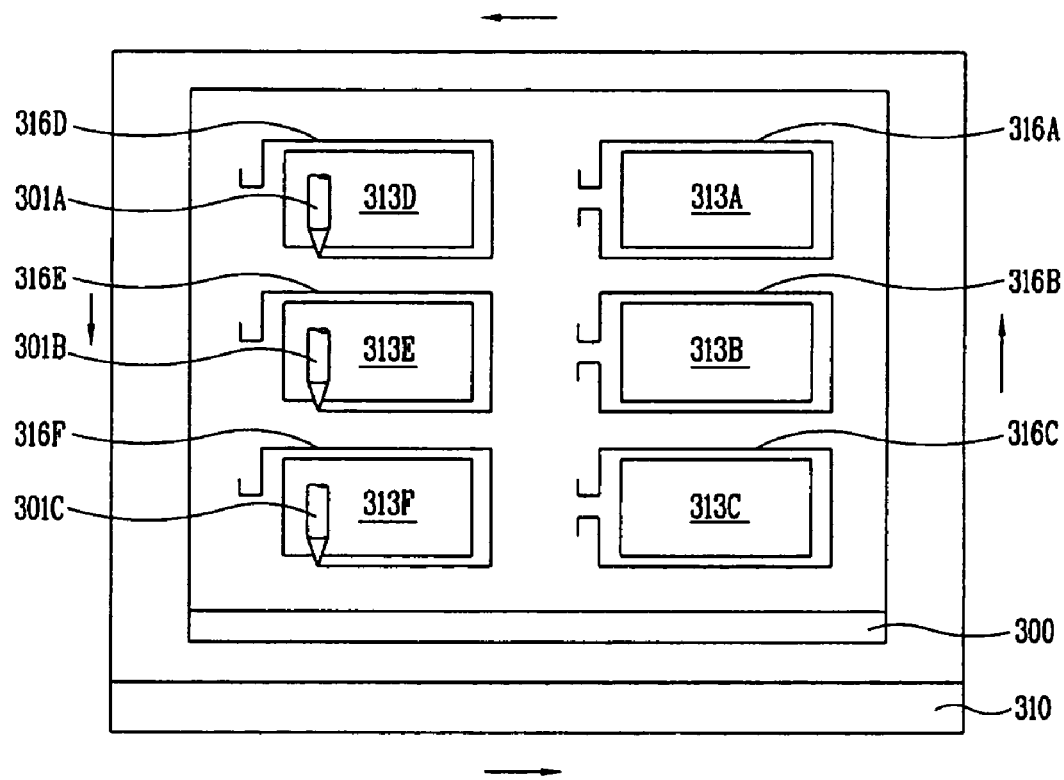
FIG. 3 is a schematic plan view of method of dispensing a seal pattern according to the related art.
Figure 4A:
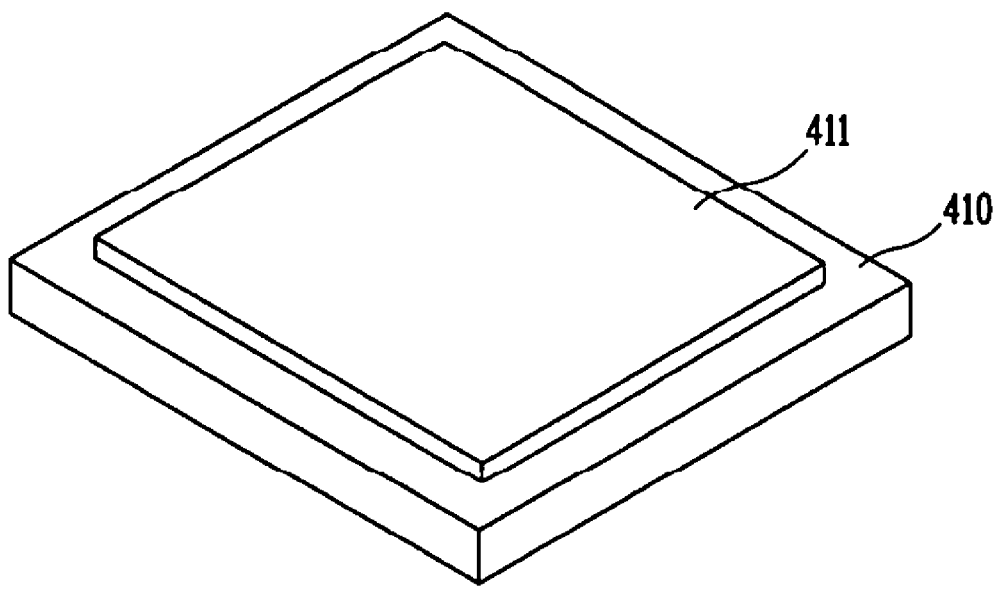
FIGS. 4A to 4F are sequential schematic perspective views of a dispenser alignment method according to the related art.
Figure 4B:
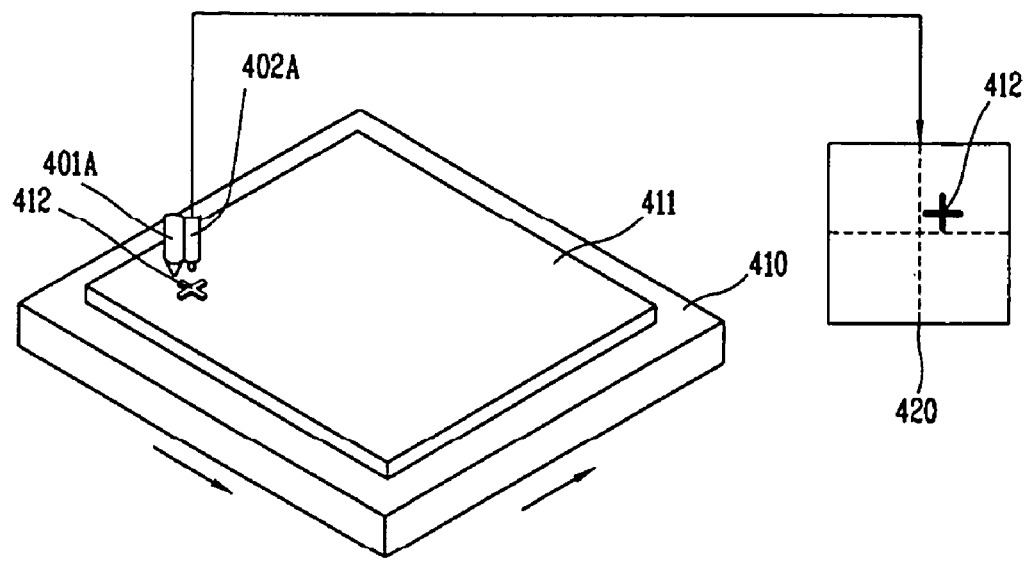
Figure 4C:
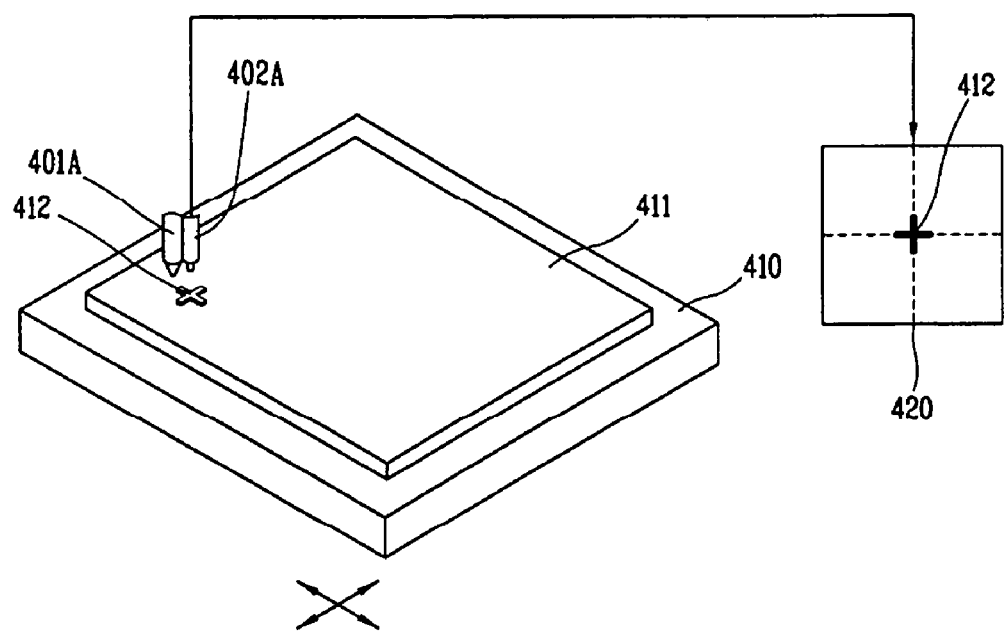
Figure 4D:
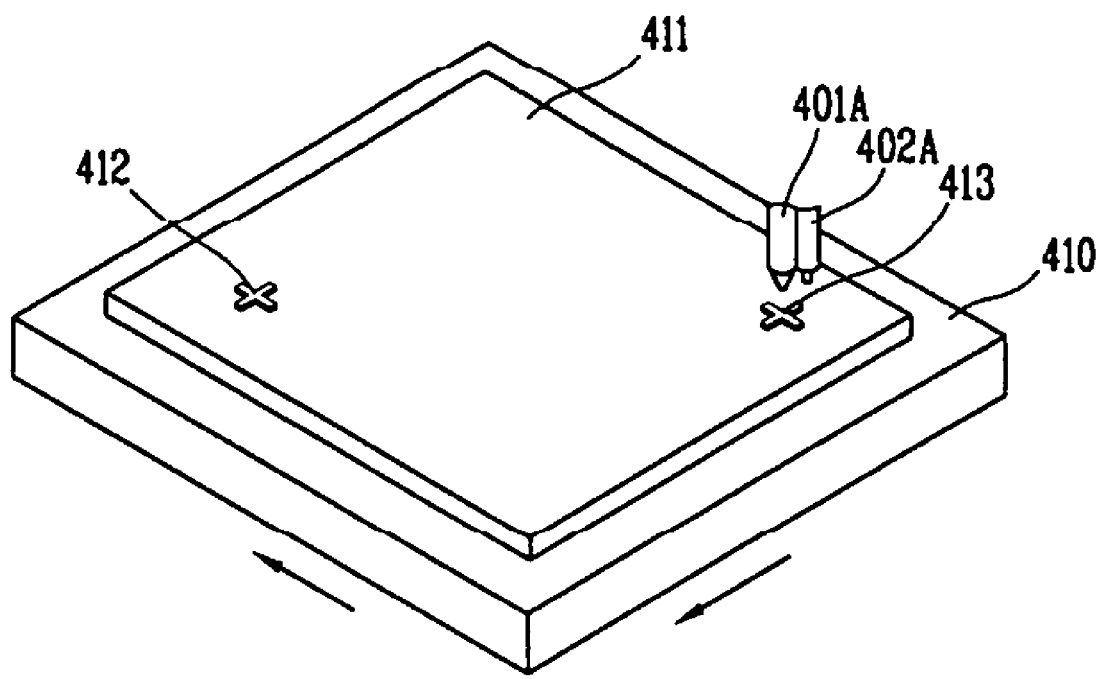
Figure 4E:
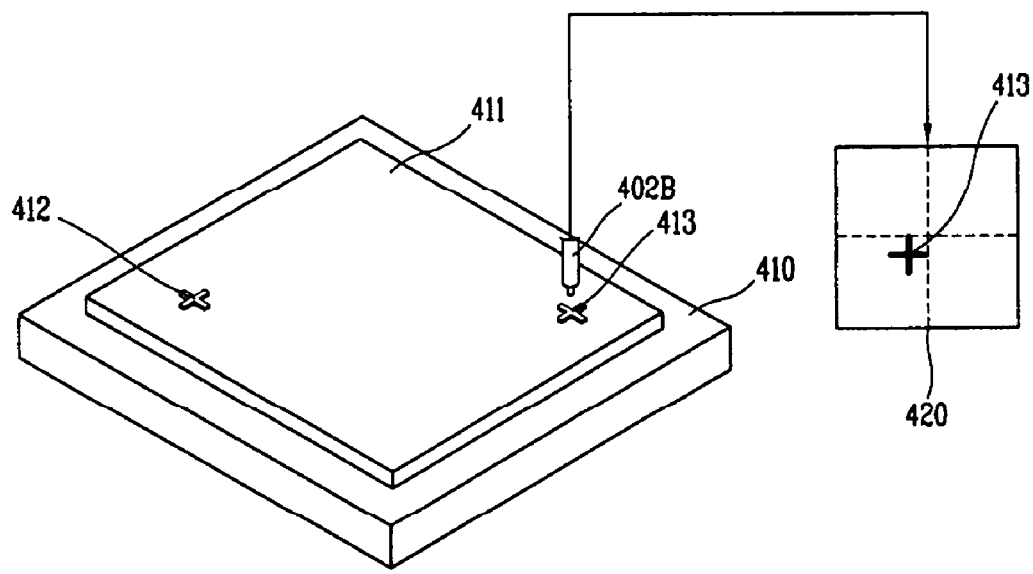
Figure 4F:
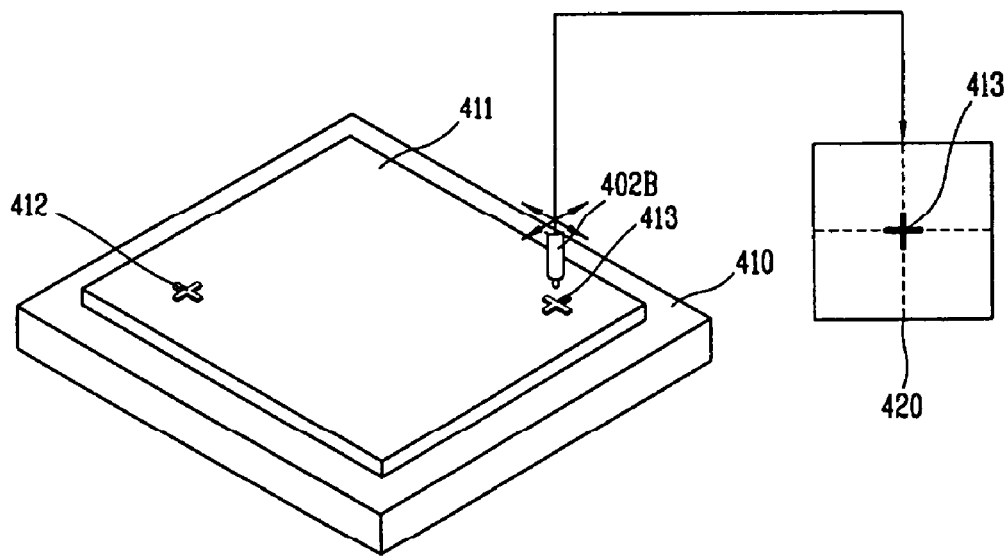
Figure 5:
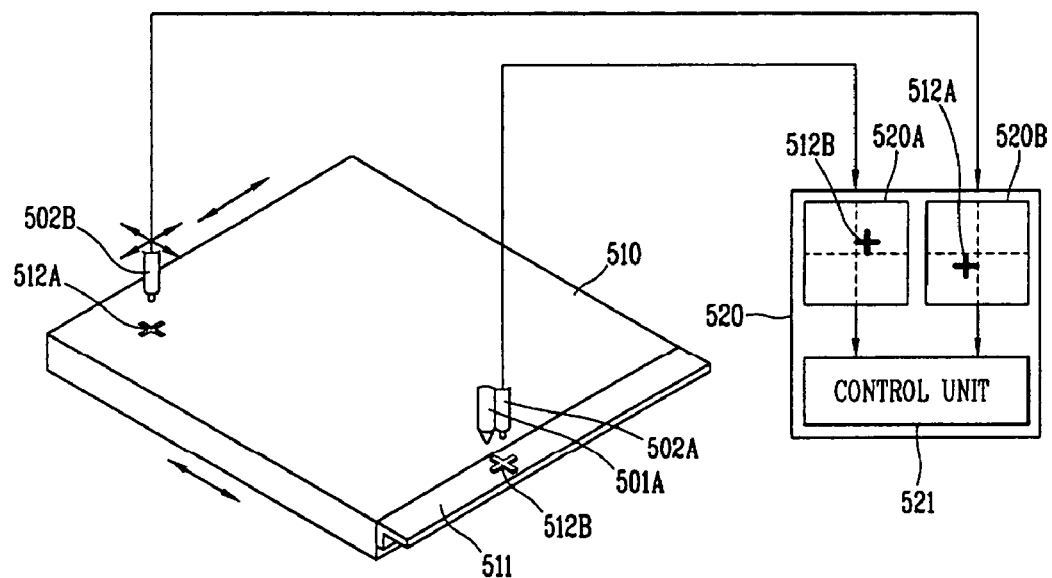
FIG. 5 is schematic perspective view of an exemplary apparatus for aligning a dispenser according to the present invention.

FIG. 5 is schematic perspective view of an exemplary apparatus for aligning a dispenser according to the present invention. In FIG. 5, a dispenser aligning apparatus may includes a table 510 having a first alignment mark 512A and driven along X- and Y-directions, an alignment plate 511 provided along a side portion of the table 510, a syringe 501A for supplying dispensing material to the alignment plate 511 to form a second alignment mark 512B when the table 510 is moved along the X- and Y-directions, a first image camera 502A provided along a side portion of the syringe 501A for detecting an image of the second alignment mark 512B formed on the alignment plate 511, a second image camera 502B for detecting an image of the first alignment mark 512A, and an alignment control unit 520. The alignment control unit 520 may control movement of the table 510 along the X- and Y-directions so that the second alignment mark 512B detected by the first image camera 502A and a first reference position may be aligned, and may control movement of the second image camera 502B along the X- and Y-directions so that the first alignment mark 512A detected by the second image camera 502B and a second reference position may be aligned.

In FIG. 5, the first alignment mark 512A may include an engraved mark disposed at a predetermined position on the table 510. For example, the first alignment mark 512A may be made of material that may not reflect light, such as aluminum oxide, and may have a cross pattern.

The alignment plate 511 may be formed of glass material having an area smaller than a substrate used for fabricating a liquid crystal display panel, and may be separably attached along a side portion of the table 510. In addition, the alignment plate 511 may be formed of glass material having an area smaller than the table 510. Alternatively, the alignment plate 511 may be separably attached along multiple side portions of the table 510, or may be separably attached to along all side portions of the table 510. In addition, the alignment plate 511 may be attached such that a top surface of the alignment plate 511 may be coplanar with a surface of the liquid crystal display panel loaded onto the table 510.

In FIG. 5, the alignment control unit 520 may include a first display part 520A for displaying the image of the second alignment mark 512B detected by the first image camera 502A and the first reference position; a second display part 520B for displaying the first alignment mark 512A detected by the second image camera 502B and the second reference position. In addition, the alignment control unit 520 may include a control unit 521 for moving the table 510 along X- and Y-directions in order to align the second alignment mark 512B and the first reference position, and for moving the second image camera 502B in order to align the first alignment mark 512A and the second reference position. Of course, the alignment control unit 520 may include an automated system, or a manual system, or a combination of automated and manual systems. Although not shown, the alignment control unit 520 may include further control systems, as well as monitoring and feedback systems. Moreover, the control unit 520 may provide for moving the table 510 along combinations of X-, Y-, and Z-directions.

Figure 6A:
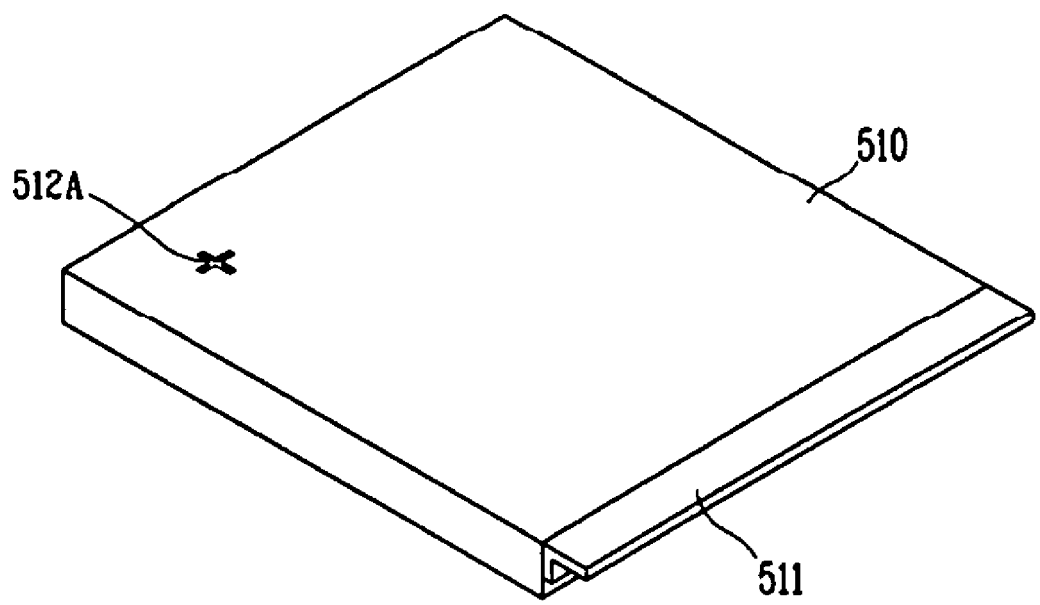
FIGS. 6A to 6E are sequential schematic perspective views of an exemplary method for aligning a dispenser by using the exemplary apparatus of FIG. 5 according to the present invention.

FIGS. 6A to 6E are sequential schematic perspective views of an exemplary method for aligning a dispenser by using the exemplary apparatus of FIG. 5 according to the present invention. In FIG. 6A, the alignment plate 511, such as glass material, may have an area smaller than the substrate of the liquid crystal display panel, and may be provided along a side portion of the table 510 having the first alignment mark 512A. In addition, the alignment plate 511 may have an area smaller than the table 510. The first alignment mark 512A may be formed of material that may not reflect light, such as aluminum oxide, and may have a cross pattern. Then, the substrate of the liquid crystal display panel may be loaded onto the table 510. Alternatively, a dispenser may be first aligned and then the substrate of the liquid crystal display panel may be loaded onto the table 510.

Figure 6B:
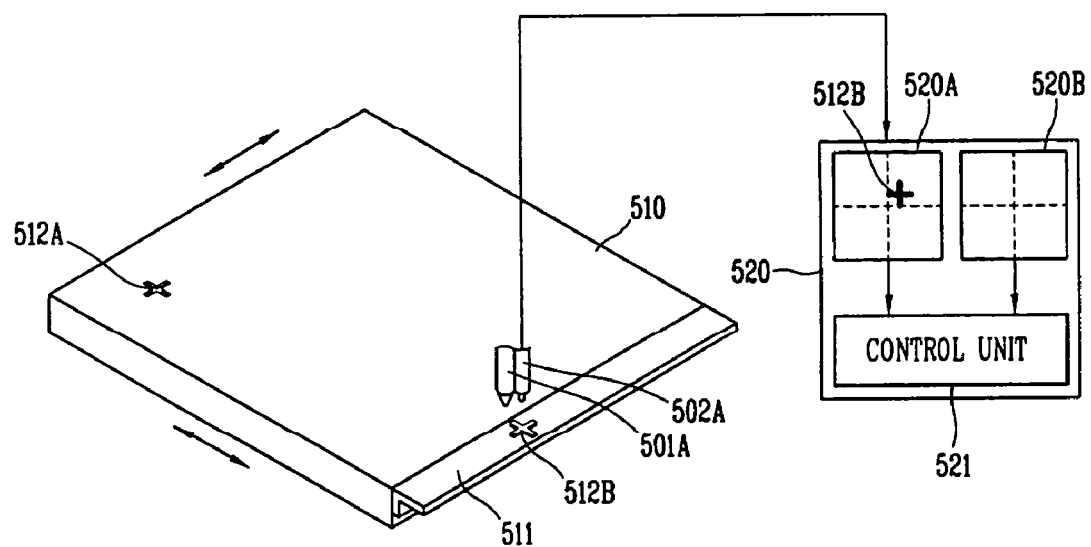

In FIG. 6B, the table 510 may be moved to a predetermined position, and sealant material may be discharged onto the alignment plate 511 through a nozzle (not shown) provided at an end portion of the syringe 501A to form the second alignment mark 512B. Then, an image of the second alignment mark 512B may be detected using the first image camera 502A provided along a side of the syringe 501A, and may be displayed using the first display part 520A of the alignment control unit 520. The second alignment mark 512B may have the same cross pattern as the first alignment mark 512A, and the first display part 520A may simultaneously display the image of the second alignment mark 512B and the first reference position. Of course, the first and second alignment marks 512A and 512B may have other patterns or configurations in order to provide an image onto the first and second display parts 520A and 520B. For example, the first and second alignment marks 512A and 512B may have like or dissimilar geometrical shapes. Moreover, the first and second display parts 520A and 520B may have like or dissimilar reference positions.

Figure 6C:
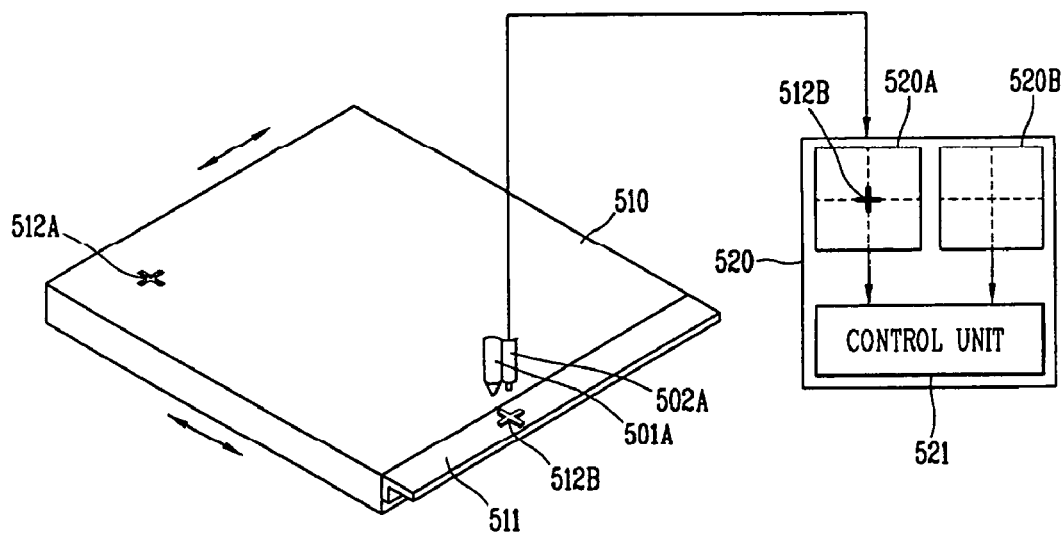

In FIG. 6C, the table 510 may be moved along the X- and Y-directions using the control unit 521 of the alignment control unit 520, in order to align the image of the second alignment mark 512B and the first reference position displayed on the first display part 520A so as to correspond to each other.

Figure 6D:
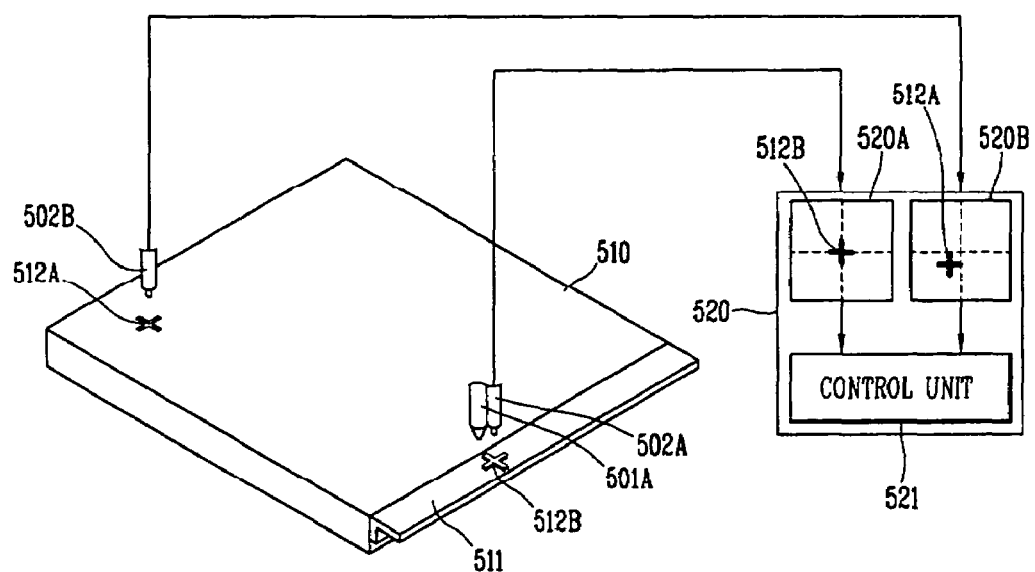

In FIG. 6D, the image of the first alignment mark 512A on the table 510 may be detected using the second image camera 502B, and may be displayed using the second display part 520B of the alignment control unit 520. Accordingly, the second display part 520B may simultaneously display the image of the first alignment mark 512A and the second reference position.

Figure 6E:
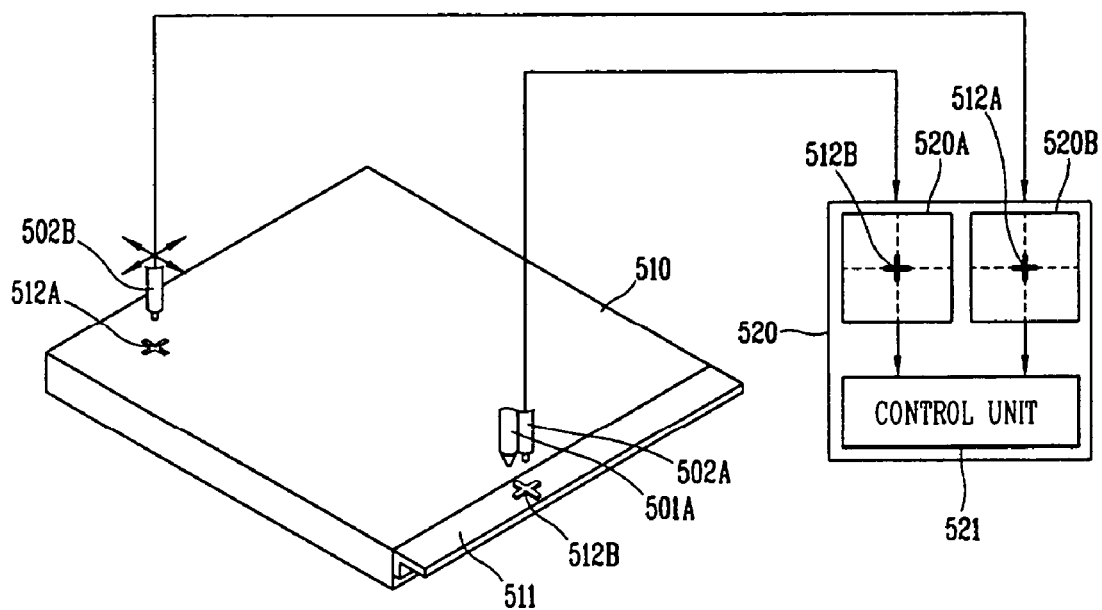

In FIG. 6E, the second image camera 502B may be moved along the X- and Y-directions using the control unit 521 of the alignment control unit 520 in order to align the image of the first alignment mark 512A and the second reference position displayed on the second display part 520B so as to be correspond to each other. Then, the substrate having the plurality of image display parts formed thereon may be loaded onto the table 510, and seal patterns may be formed along each outer edge portion of the image display parts using a plurality of syringes.

Figure 7:
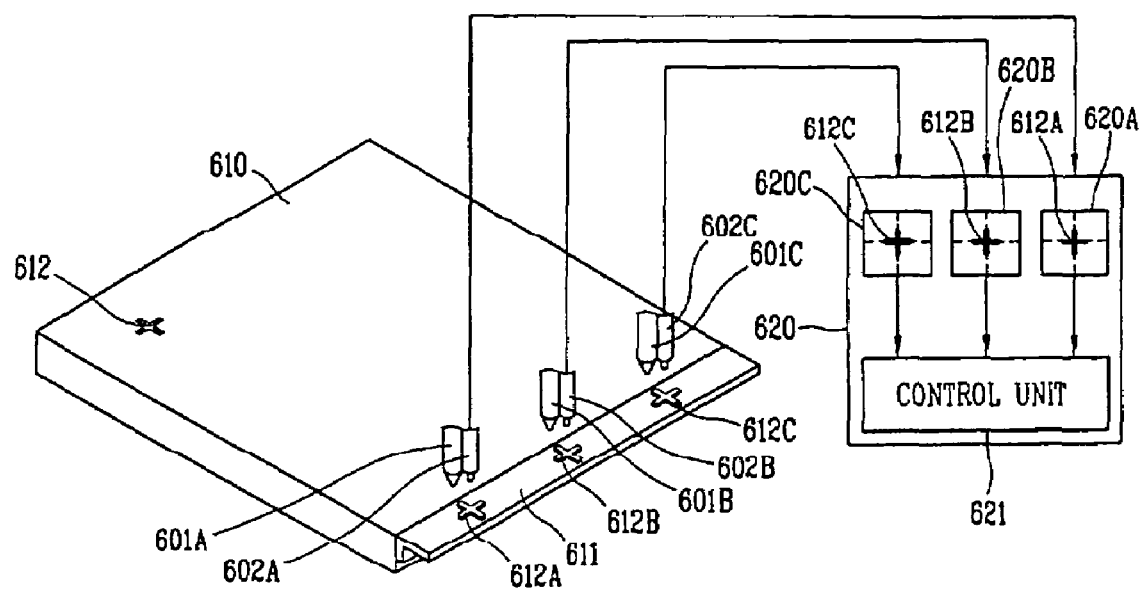
FIG. 7 is a perspective view of another exemplary apparatus for aligning a dispenser according to the present invention.

FIG. 7 is a perspective view of another exemplary apparatus for aligning a dispenser according to the present invention. According to the present invention, since features of FIG. 7 may be similar to the features of the exemplary apparatus shown in FIGS. 5 and 6A-6E, detailed description of these similar features have been omitted for the sake of brevity. Moreover, since operation of the exemplary apparatus of FIG. 7 may be similar to operation of the exemplary apparatus shown in FIGS. 5 and 6A-6E, detailed description of the similar operational steps have been omitted for the sake of brevity. For example, operation of the exemplary apparatus shown in FIGS. 5 and 6A-6E include use of a single syringe 501A to form a second alignment mark 512B and a first image camera 502A provided along a side portion of the syringe 501A, whereas the exemplary apparatus of FIG. 7 may include a plurality of syringes 601A, 601B, and 601C to form a plurality of alignment marks 612A, 612B, and 612C, and a plurality of image cameras 602A, 602B, and 602C.

In FIG. 7, a dispenser aligning apparatus may includes a table 610 having a first alignment mark 612 and driven along X- and Y-directions, an alignment plate 611 provided along a side portion of the table 610, a plurality of syringes 601A, 601B, and 601C for supplying dispensing material to the alignment plate 611 to form a plurality of alignment marks 612A, 612B, and 612C when the table 610 is moved along the X- and Y-directions, a plurality of image cameras 602A, 602B, and 602C provided along a side portion of each of the plurality of syringes 601A, 601B, and 601C for detecting an images of the alignment marks 612A, 612B, and 612C formed on the alignment plate 611, and an alignment control unit 620. Although not shown, an additional image camera is provided for detecting an image of a first alignment mark 612 formed in the table 610, similar to features shown in FIGS. 5 and 6A-6E. The alignment control unit 620 may control movement of the table 610 along the X- and Y-directions so that the plurality of alignment marks 612A, 612B, and 612C detected by the plurality of image cameras 602A, 602B, and 602C and a plurality of reference positions may be aligned, and may control movement of the addition image camera (not shown) along the X- and Y-directions so that the first alignment mark 612 detected by the additional image camera (not shown) and an additional reference position (not shown) may be aligned.

In FIG. 7, the additional alignment mark 612 may include an engraved mark disposed at a predetermined position on the table 610. For example, the additional alignment mark 612 may be made of material that may not reflect light, such as aluminum oxide, and may have a cross pattern.

The alignment plate 611 may be formed of glass material having an area smaller than a substrate used for fabricating a liquid crystal display panel, and may be separably attached along a side portion of the table 610. In addition, the alignment plate 611 may be formed of glass material having an area smaller than the table 610. Alternatively, the alignment plate 611 may be separably attached along multiple side portions of the table 610, or may be separably attached to along all side portions of the table 610. In addition, the alignment plate 611 may be attached such that a top surface of the alignment plate 611 may be coplanar with a surface of the liquid crystal display panel loaded onto the table 610.

In FIG. 7, the alignment control unit 620 may include a plurality of display parts 620A, 620B, and 620C for displaying the images of the plurality of alignment marks 612A, 612B, and 612C detected by the plurality of image cameras 602A, 602B, and 602C and the plurality of reference positions. Although not shown, but similar to the second display part 520B (in FIGS. 5 and 6A-6E) for displaying the additional alignment mark 612 detected by the additional image camera (not shown) and the additional reference position (not shown). In addition, the alignment control unit 620 may include a control unit 621 for moving the table 610 along X- and Y-directions in order to align the additional alignment mark 612 and the additional reference position, and for moving the additional image camera (not shown) in order to align the additional alignment mark 612 and the additional reference position. Of course, the alignment control unit 620 may include an automated system, or a manual system, or a combination of automated and manual systems. Although not shown, the alignment control unit 620 may include further control systems, as well as monitoring and feedback systems. Moreover, the control unit 620 may provide for moving the table 610 along combinations of X-, Y-, and Z-directions.

The seal patterns may be formed having various configurations according to methods for forming the liquid crystal layer of the liquid crystal display panel. In other words, when forming the liquid crystal layer using a vacuum injection method, the seal patterns may be formed having an opening to form a liquid crystal injection port along a side of the image display parts. When forming the liquid crystal layer using a dropping method, wherein liquid crystal material is dropped onto one of a TFT array substrate or a CF substrate of the liquid crystal display panel then attached together, the seal patterns may be formed having a closed loop pattern to encompass each outer edge portion of the image display parts.

According to the present invention, the dispenser may be precisely aligned using a table having an alignment mark upon which a substrate of a liquid crystal display panel is loaded thereon and an alignment plate attached to a side portion of the table and having another alignment mark, wherein the alignment plate may have an area smaller than the substrate of the liquid crystal display panel. Then, seal patterns may be formed on the substrate using a plurality of syringes. Thus, using of a dummy substrate for alignment processes may not be required, thereby allowing for quick alignment of a dispenser and reducing production unit costs of LCD devices. In addition, clean room space efficiency may be increased.

According to the present invention, when an amount of sealant material in a syringe is below a predetermined level and insufficient to form seal patterns, the syringe is replaced with a new syringe and dispenser aligning may repeated when the substrate of the liquid crystal display panel is loaded onto the table. Alternatively, when a defective seal pattern is detected during a follow-up testing process, dispenser aligning may be repeated when the substrate of the liquid crystal display panel is loaded onto the table.

Thus, since an alignment plate may be attached along a side portion of a table, even when the substrate of a liquid crystal display panel is loaded onto a table, an alignment mark may be formed on the alignment plate using a syringe. Accordingly, an image of the alignment mark formed on the alignment plate may be detected using an image camera and may be aligned with a reference position. In addition, since the substrate of the liquid crystal display panel may be formed of transparent glass material, an image of an alignment mark on the table may be detected using an image camera and aligned with the a reference position.

In addition, according to the present invention, an alignment plate attached along a side portion of a table may be used to precisely align a plurality of syringes which form seal patterns on a substrate of a liquid crystal display panel, and may control a gap between the substrate of the liquid crystal display panel and the syringes. When the substrate of the liquid crystal display panel is loaded onto the table and seal patterns are formed using the plurality of syringes, precise alignment of the plurality of syringes and precise control of the gap between the substrate of the liquid crystal display panel and the syringes may be achieved. For example, if the plurality of syringes that form seal patterns on the substrate of the liquid crystal display panel are not properly aligned, then the seal patterns may be improperly formed within image display parts of the liquid crystal display panel, rather than being formed along outer edge portions of the image display parts. This misalignment creates a defective liquid crystal display panel.

In addition, if the plurality of syringes that form seal patterns on the substrate of the liquid crystal display panel and the substrate of the liquid crystal display panel are positioned too close to one another or if they are spaced too far apart from one another, as compared to a desired gap, a width and height of the seal patterns may not be uniform and some portions of the seal patterns may be broken. This error in spacing also may cause a defective liquid crystal display panel.

The present invention overcomes these potential problems. In the present invention, alignment marks are formed on an alignment plate attached to a side portion of a table using a plurality of syringes, which form seal patterns on a substrate of a liquid crystal display panel, may be detected by using image cameras provided along a side of the plurality of syringes, thereby providing for precise alignment of the plurality of syringes.

In addition, a plurality of syringes, which form seal patterns on a substrate of a liquid crystal display panel, may descend to contact an alignment plate attached along a side portion of a table. In addition, the plurality of syringes may ascend to a certain height to have a desired gap between each nozzle of the plurality of syringes and the alignment plate.

According to the present invention, a dispenser may be precisely aligned using a table having a first alignment mark upon which a substrate of a liquid crystal display panel may be loaded, and an alignment plate attached along a side portion of the table having a second alignment mark and an area smaller than the substrate of the liquid crystal display panel, thereby forming seal patterns on the substrate by using the plurality of syringes.

According to the present invention, since a dummy substrate is not required for aligning a dispenser, a process for aligning the dispenser may be quickly performed, thereby increasing productivity of the LCD device and reducing production unit costs of the LCD. In addition, since a dummy substrate is not required, efficient use of clean room space may be increased, thereby reducing facility maintenance and repair costs.

It will be apparent to those skilled in the art that various modifications and variations can be made in the an apparatus for aligning a liquid crystal dispenser, method of aligning a liquid crystal dispenser, and a dispenser alignment system of the present invention without departing from the spirit or scope of the invention. Thus, it is intended that the present invention covers the modifications and variations of this invention provided they come within the scope of the appended claims and their equivalents.

What is claimed is:

1. A method for aligning a dispenser, comprising:
   providing a table having a first alignment mark on which a substrate is loaded;
   attaching an alignment plate along at least one side of the table;
   dispensing sealant on the alignment plate using a first syringe to form a second alignment mark on the alignment plate;
   detecting the image of the second alignment mark in a first display unit using a first image camera;
   moving the table along at least one of X- and Y-directions to align the image of the second alignment mark with a first reference position using the first display unit;
   detecting the image of the first alignment mark in a second display unit using a second image camera, the image of the first alignment mark is detected to the second image camera through the substrate;
   moving the second image camera along at least one of X- and Y-directions to align the image of the first alignment mark with a second reference position using the second display unit; and
   forming a seal pattern on the substrate using at least one second syringe,
   wherein the alignment plate is disposed at the side of the substrate on the table and a surface of the alignment plate is coplanar to a surface of the substrate.

2. The method according to claim 1, wherein the seal pattern includes an opening.

3. The method according to claim 1, wherein the seal pattern includes a closed loop pattern.

4. The method according to claim 1, further comprising:
   forming third alignment marks on the alignment plate attached to the table using a plurality of second syringes; and
   detecting images of the third alignment marks using third image cameras provided along a side portion of the second syringes and aligning the second syringes.

5. The method according to claim 1, further comprising:
   descending at least one second syringe to contact the alignment plate attached to the table; and
   ascending the second syringe to form a distance between a nozzle of the second syringe and a surface of the alignment plate.

6. The method according to claim 5, wherein the surface of the alignment plate attached to the table is coplanar to a surface of a substrate of a liquid crystal display panel loaded onto the table.

7. The method according to claim 1, wherein the first and second alignment marks have horizontal and vertical patterns.

* * * * *